(12) United States Patent
Gurvich et al.

(10) Patent No.: US 11,453,502 B2
(45) Date of Patent: Sep. 27, 2022

(54) AIRCRAFT SEAT FRAME WITH ENHANCED DYNAMIC RESPONSE

(71) Applicant: B/E Aerospace, Inc., Winston-Salem, NC (US)

(72) Inventors: Mark R. Gurvich, Middletown, CT (US); Isaac Cohen, West Hartford, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/225,906

(22) Filed: Apr. 8, 2021

(65) Prior Publication Data

US 2021/0323681 A1    Oct. 21, 2021

Related U.S. Application Data

(60) Provisional application No. 63/011,162, filed on Apr. 16, 2020.

(51) Int. Cl.
*B64D 11/06*    (2006.01)

(52) U.S. Cl.
CPC ...... *B64D 11/0648* (2014.12); *B64D 11/0619* (2014.12)

(58) Field of Classification Search
CPC .......................... B64D 11/0648; B64D 11/0619
See application file for complete search history.

(56) References Cited

U.S. PATENT DOCUMENTS

| | | | |
|---|---|---|---|
| 6,802,568 B1 | 10/2004 | Johnson | |
| 8,667,754 B2 | 3/2014 | Schalla et al. | |
| 8,974,002 B2 * | 3/2015 | Le | B64D 11/06 297/452.2 |
| 9,352,538 B1 * | 5/2016 | Olason | B29C 53/586 |
| 10,124,899 B2 | 11/2018 | Mansour et al. | |
| 10,343,780 B2 | 7/2019 | Portoles et al. | |
| 10,494,104 B2 * | 12/2019 | Jaeger | B64D 11/0648 |

(Continued)

FOREIGN PATENT DOCUMENTS

| | | |
|---|---|---|
| EP | 3696430 A1 | 8/2020 |
| TW | M489811 U | 11/2014 |
| WO | 2010117920 A1 | 10/2010 |

OTHER PUBLICATIONS

Extended Search Report for European Application No. 21152575.3 dated Jun. 18, 2021, 11 pages.

*Primary Examiner* — Timothy J Brindley
(74) *Attorney, Agent, or Firm* — Suiter Swantz pc llo

(57) ABSTRACT

A frame beam member may include a tubular volume. The tubular volume may include at least one wall with one or more undulations in a radial direction along a length of the tubular volume. The one or more undulations may be configured to allow the tubular volume to absorb energy of a load applied during a flight scenario through local bending of the one or more undulations. The one or more undulations may be configured to have a first curvature when unloaded, and may be configured to have a second curvature when the load is applied. The second curvature may be different than the first curvature. The frame beam member may be one of a plurality of frame beam members of the aircraft seat frame. The plurality of frame beam members may be configured to couple to a plurality of joints of the aircraft seat frame.

19 Claims, 8 Drawing Sheets

(56) References Cited

U.S. PATENT DOCUMENTS

| | | |
|---|---|---|
| 10,532,518 B2 | 1/2020 | Gurvich et al. |
| 10,717,533 B2 * | 7/2020 | Saada ................ B64D 11/0648 |
| 2005/0115186 A1 | 6/2005 | Jensen et al. |
| 2007/0079930 A1 | 4/2007 | Parkin |
| 2015/0210394 A1 * | 7/2015 | Joffre ................ B64D 11/0648 |
| | | 297/216.1 |
| 2019/0217549 A1 | 7/2019 | Cowart |
| 2019/0276153 A1 * | 9/2019 | Tranier .............. B64D 11/0693 |
| 2019/0337625 A1 * | 11/2019 | Le ........................... B60N 2/68 |

\* cited by examiner

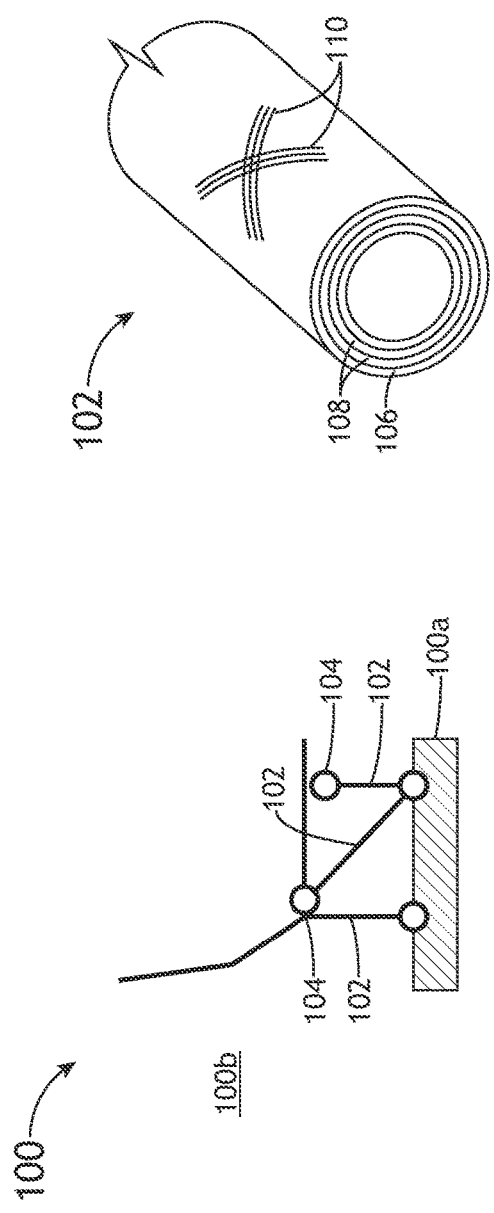
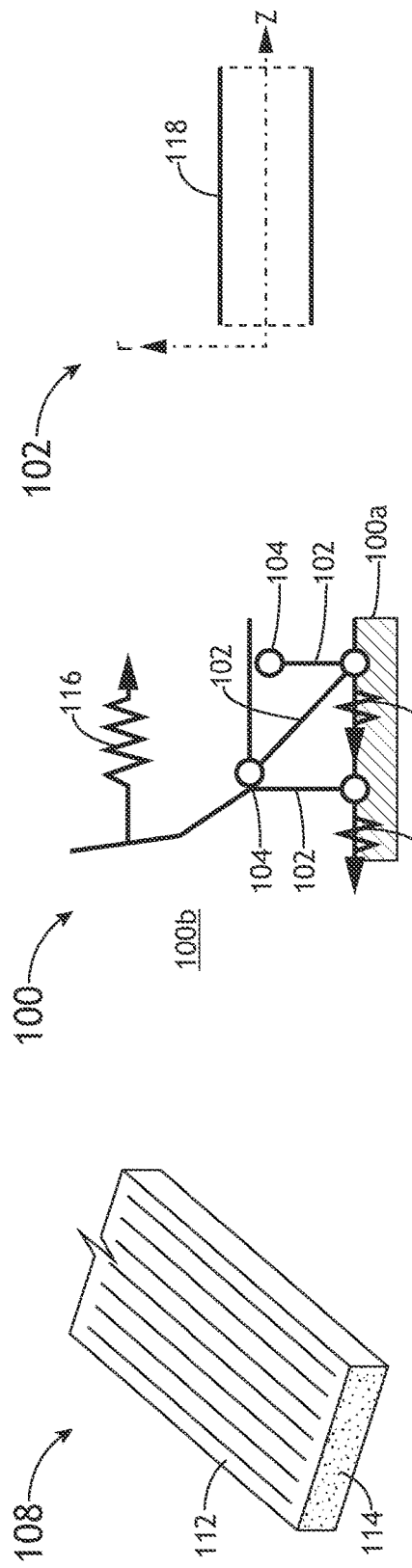

AIRCRAFT SEAT FRAME WITH ENHANCED DYNAMIC RESPONSE

CROSS-REFERENCE TO RELATED APPLICATIONS

The present application is related to and claims benefit of the earliest available effective filing date from the following applications: the present application claims the benefit of U.S. Provisional Application Ser. No. 63/011,162, filed Apr. 16, 2020, which is incorporated herein by reference in the entirety.

BACKGROUND

Aircraft seat frames may be subjected to dynamic loads and corresponding dynamic reactions during a flight, which may generate additional stresses within the frame beam members of the aircraft seat frame. Conventional frame beam members may include beam elements with a tubular volume and a uniform axial cross-section along the entire length of the tubular volume. Although the uniform axial cross-section may have or result in a high stiffness and/or strength that is desirable in static and/or quasi-static loads, the uniform axial cross-section may not have a sufficient elasticity and/or capability to absorb energy of the dynamic loads.

SUMMARY

A frame beam member for an aircraft seat frame with enhanced dynamic response is disclosed, in accordance with one or more embodiments of the disclosure. The frame beam member may include a tubular volume. The tubular volume may include at least one wall with one or more undulations in a radial direction along a length of the tubular volume. The one or more undulations may be configured to allow the tubular volume to absorb energy of a load applied during a flight scenario through local bending of the one or more undulations. The one or more undulations may be configured to have a first curvature when unloaded. The one or more undulations may be configured to have a second curvature when the load is applied. The second curvature may be different than the first curvature. The frame beam member may be one of a plurality of frame beam members of the aircraft seat frame. The plurality of frame beam members may be configured to couple to a plurality of joints of the aircraft seat frame. At least one joint of the plurality of joints or at least one frame beam member of the plurality of frame beam members may be configured to couple to an aircraft body.

In some embodiments, the at least one wall of the tubular volume may include a single segment with the one or more undulations.

In some embodiments, the at least one wall of the tubular volume may include at least one segment with the one or more undulations and at least one segment with a uniform axial cross-section.

In some embodiments, the at least one wall of the tubular volume may include a single segment with the one or more undulations located at a mid-length point of the tubular volume and a segment with the uniform axial cross-section located at each end of the tubular volume.

In some embodiments, the at least one wall of the tubular volume may include a single segment with the uniform axial cross-section located at a mid-length point of the tubular volume and a segment with the one or more undulations located at each end of the tubular volume.

In some embodiments, the at least one wall of the tubular volume may include a single segment with the uniform axial cross-section located at a first end of the tubular volume and a single segment with the one or more undulations located at a second end of the tubular volume.

In some embodiments, the one or more undulations may be separately positioned a select distance along the length of the tubular volume from an end of the tubular volume.

In some embodiments, the one or more undulations may be in a spiral formation around the tubular volume along the length of the tubular volume.

In some embodiments, the one or more undulations may include, in an axial cross-section, at least one of a double curvature shape, a polygonal shape, a hybrid polygonal and convex curvature shape, a hybrid polygonal and concave curvature shape, or a combination.

In some embodiments, the one or more undulations being arranged at least one of radially outward along the length of the tubular volume or radially inward along the length of the tubular volume.

In some embodiments, the frame beam member may be fabricated from a fiber-reinforced polymer-matrix composite material. The reinforced fibers may include at least one of carbon fibers, glass fibers, organic fibers, or a combination. The polymer-matrix may be a thermoset or a thermoplastic.

In some embodiments, the one or more undulations of the at least one wall of the tubular volume may be formed on an exterior surface of a mold configured to be removed following fabrication.

In some embodiments, the one or more undulations of the at least one wall of the tubular volume may be formed on an exterior surface of a mold configured to remain inserted following fabrication.

In some embodiments, the frame beam member may be fabricated from a metal, alloy, metalloid, non-metal element, or a compound including at least one of a metal, alloy, metalloid, or non-metal element.

An aircraft seat frame with enhanced dynamic response is disclosed, in accordance with one or more embodiments of the disclosure. The aircraft seat frame may include a plurality of frame beam members. Each frame beam member of the plurality of frame beam members may include a tubular volume. The tubular volume may include at least one wall with one or more undulations along at least a portion of a length of the tubular volume. The one or more undulations may be configured to allow the tubular volume to absorb energy of a load applied during a flight scenario through local bending of the one or more undulations. The one or more undulations may be configured to have a first curvature when unloaded. The one or more undulations may be configured to have a second curvature when the load is applied. The second curvature may be different than the first curvature. The aircraft seat frame may include a plurality of joints configured to couple to the plurality of frame beam members. At least one joint of the plurality of joints or at least one frame beam member of the plurality of frame beam members may be configured to couple to an aircraft body.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1A illustrates a simplified schematic view of an aircraft seat frame, in accordance with one or more embodiments of the disclosure;

FIG. 1B illustrates a perspective view of a segment of a frame beam member of an aircraft seat frame, in accordance with one or more embodiments of the disclosure;

FIG. 1C illustrates a schematic view of an individual composite layer of a frame beam member of an aircraft seat frame, in accordance with one or more embodiments of the disclosure;

FIG. 1D illustrates a schematic view of a frame beam member section of an aircraft seat frame under dynamic load conditions, in accordance with one or more embodiments of the disclosure;

FIG. 1E illustrates an axial uniform cross-sectional view of a frame beam member, in accordance with one or more embodiments of the disclosure;

DETAILED DESCRIPTION OF THE INVENTION

Figure 2A:
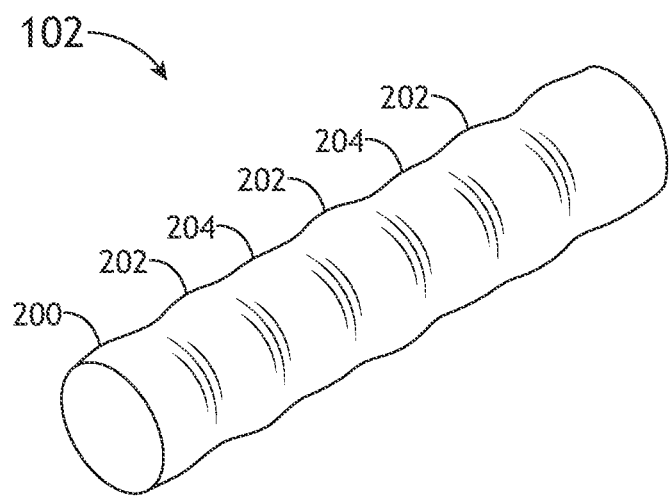
FIG. 2A illustrates a perspective view of an undulated frame beam member of an aircraft seat frame with enhanced dynamic response in an unloaded state, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral may be used to reference an embodiment of the feature or element that may be similar, but not necessarily identical, to a previously described element or feature bearing the same reference numeral (e.g., 1, 1a, 1b). In addition, a letter following a reference numeral may be used to reference a sub-feature or sub-element or sub-system of a larger feature or element or system (e.g., 1a or 1b being a component of 1). Such shorthand notations are used for purposes of convenience only and should not be construed to limit the disclosure in any way unless expressly stated to the contrary.

In addition, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Further, the terms or transitional phrases "including" and "having" may be considered equivalent, for purposes of the disclosure. In this regard, the term or transitional phrase "having" should not be interpreted as a limitation on the present disclosure, including with respect to the openness of the claim language.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-5C in general illustrate an aircraft seat frame with enhanced dynamic response, in accordance with one or more embodiments of the disclosure.

FIGS. 1A-1E in general illustrate an aircraft seat frame 100, in accordance with one or more embodiments of the disclosure.

Referring now to at least FIG. 1A, the aircraft seat frame 100 may include one or more frame beam members 102. The one or more frame beam members 102 may be coupled via one or more joints 104, where the one or more frame beam members 102 and/or the one or more joints 104 may be configured to couple to an aircraft body. For example, the aircraft body may include, but is not limited to, a floor 100a of an aircraft cabin 100b (e.g., either directly or indirectly via an intermediate frame foot). For example, the one or more frame beam members 102 and the one or more joints 104 may be coupled via at least one of, but are not limited to, one or more interlocking assemblies (e.g., self-locking joints, or the like), one or more fasteners (e.g., rivets, screws, or the like), an adhesive, or some combination of the above. The one or more joints 104 may be fabricated from a metal, alloy, metalloid, or non-metal element or a compound including a metal, alloy, metalloid, or non-metal element. It is noted herein that aircraft seat frame joints are further described in U.S. Pat. No. 10,532,518 B2, issued on Jan. 14, 2020, which is incorporated herein in the entirety. In addition, it is noted herein that "frame beam member" and "frame element" may be considered equivalent, for purposes of the disclosure.

Referring now to at least FIG. 1B, the one or more frame beam members 102 may be fabricated from a lightweight composite material. The one or more frame beam members 102 may be fabricated with a laminated design. For example, a frame beam member 102 may include an exterior laminated structure 106 and one or more individual layers 108. Where there are multiple individual layers 108, the multiple individual layers 108 may be oriented in a criss-cross or other overlapping pattern defined in one or more directions 110 within the frame beam member 102. It is noted herein that the multiple individual layers 108 may be fabricated from the same composite material or a different composite material.

Although embodiments of the disclosure illustrate the one or more frame beam members 102 being fabricated with a laminated design, it is noted herein the one or more frame beam members may be fabricated with composite designs via fabrication processes including, but not limited to, Automated Fiber Placing (AFP), filament-winding, braiding, a combination of these fabrication processes, or the like. In addition, composite layups may include, but are not limited to, laminated designs based on an arrangement of uni-directionally reinforced layers, laminated designs based on fabric layers, 3D reinforcement layups, and their combinations. The composite design may be fabricated from a fiber-reinforced polymer-matrix composite material. For example, the reinforced fibers may include at least one of carbon fibers, glass fibers, organic fibers, a combination of these fibers, or the like. By way of another example, the polymer-matrix may be a thermoset or a thermoplastic. Therefore, the above description should not be interpreted as a limitation on the present disclosure but merely an illustration.

Referring now to at least FIG. 1C, an individual layer 108 may include a plurality of reinforced fibers 112 in the one or more directions 110 set within a polymeric matrix 114. For example, the plurality of reinforced fibers 112 may include, but are not limited to, reinforced carbon fibers, reinforced organic fibers, reinforced glass fibers, or a combination of fibers used in the fabrication of composite beam elements. By way of another example, the polymeric matrix 114 may include, but is not limited to, a thermoset or a thermoplastic.

The composite material from which the one or more frame beam members 102 may be fabricated may be selected to reduce weight of the aircraft seat frame 100 (and thus the enclosing aircraft seat). The composite material may possess high strength and stiffness properties, making it suitable for use in major load-bearing parts such as the one or more frame beam members 102 within the aircraft seat frame 100.

Referring now to at least FIG. 1D, the aircraft seat frame 100 may be subjected to dynamic loads and corresponding dynamic reactions during a flight, which may generate additional stresses within the one or more frame beam members 102 of the aircraft seat frame 100. For example, the dynamic loads may include, but are not limited to, an emergency landing, a rapid stop, excessive acceleration, a fast takeoff, an impact event (e.g., due to bird strikes), a ballistic impact, or the like. The dynamic loads may generate local dynamic reactions or dynamic load conditions 116 distributed axially within the one or more frame beam members 102. Depending on seat frame configuration and/or designs of joints 104, the dynamic loads may also generate bending and/or torsional loads in the one or more frame beam members 102.

Referring now to at least FIG. 1E, conventional frame beam members may include beam elements with a tubular volume (e.g., a volume with a tubular design) and a uniform axial cross-section 118 with a constant radius r along a length z along the entire length of the tubular volume. Although the uniform axial cross-section 118 of the frame beam member 102 may have or result in a high stiffness and/or strength that is desirable in static and/or quasi-static loads, the uniform axial cross-section 118 may not have a sufficient elasticity and/or capability to absorb energy of the dynamic loads.

As such, it may be desirable to provide one or more frame beam members 102 that have a design configured to combine the advantages of the stiffness and strength properties of composite materials necessary during static or quasi-static load conditions and the elasticity and/or capability to absorb energy under dynamic load conditions. For example, it may be desired to reduce the risk of damage to the aircraft seat frame 100. By way of another example, it may be desired to reduce the risk of the injury of a seat occupant during dynamic load conditions. By way of another example, it may be desired to provide a higher comfort in static or quasi-static load conditions.

FIGS. 2A-3H in general illustrate the one or more frame beam members 102, in accordance with one or more embodiments of the disclosure.

In general, the one or more frame beam members 102 may include a tubular volume with one or more walls 200. A wall 200 may include one or more undulations. It is noted herein that "undulations" and "undulating portions" may be considered equivalent, for purposes of the disclosure.

The one or more undulations may be the same shape or may be different shapes. For example, as illustrated in FIGS. 2A-2D, the one or more undulations may be a plurality of undulations including one or more undulations 202 with a first shape and one or more undulations 204 with a second shape, where the first shape of the one or more undulations 202 may include a more aggressive curvature and the second shape of the one or more undulations 204 may include a less aggressive curvature.

In contrast with the uniform axial cross-section 118 as illustrated in FIG. 1E, the one or more undulations may allow for additional local bending deformation at higher load levels. For example, under relatively low levels of static or quasi-static loads, a frame beam member 102 with one or more undulations may deform similarly to a frame beam member 102 with a uniform axial cross-section 118. By way of another example, under increased levels of dynamic loads, the non-linearity of deformation may be more substantial due to local bending of the one or more undulations. As such, local bending deformation of the at least one wall of frame beam members 102 may provide additional elasticity and enhanced energy-absorbing capacity. In this regard, the one or more frame beam members 102 with the one or more undulations may act similar to a spring-like elastic element.

The tubular volume may be solid, such that there may not be a cavity defined within the interior of the tubular volume. It is noted herein, however, that there may be a cavity defined within the interior of the tubular volume. Therefore, the above description should not be interpreted as a limitation on the present disclosure but merely an illustration.

The one or more walls 200 may be solid, such that there are no holes through a solid tubular volume or to a cavity defined within the interior of the tubular volume. It is noted herein, however, that the one or more walls 200 may include at least one pass-through hole through a solid tubular volume or to the cavity defined within the interior of the tubular volume. Therefore, the above description should not be interpreted as a limitation on the present disclosure but merely an illustration.

Figure 2B:
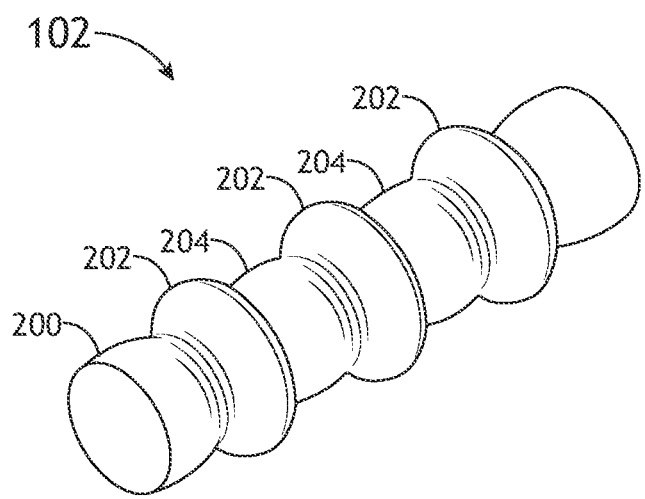
FIG. 2B illustrates a perspective view of an undulated frame beam member of an aircraft seat frame with enhanced dynamic response in a compressive-load state, in accordance with one or more embodiments of the disclosure.
Figure 2C:
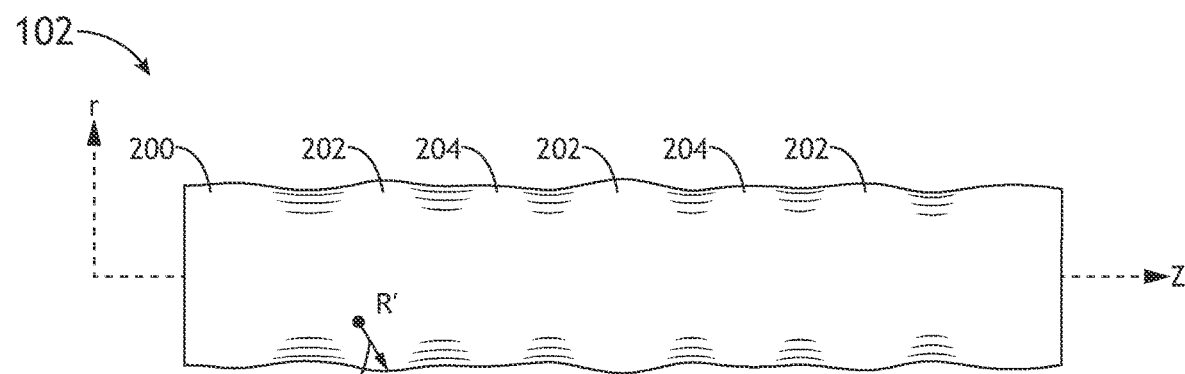
FIG. 2C illustrates a side view of an undulated frame beam member of an aircraft seat frame with enhanced dynamic response in an unloaded state, in accordance with one or more embodiments of the disclosure.
Figure 2D:
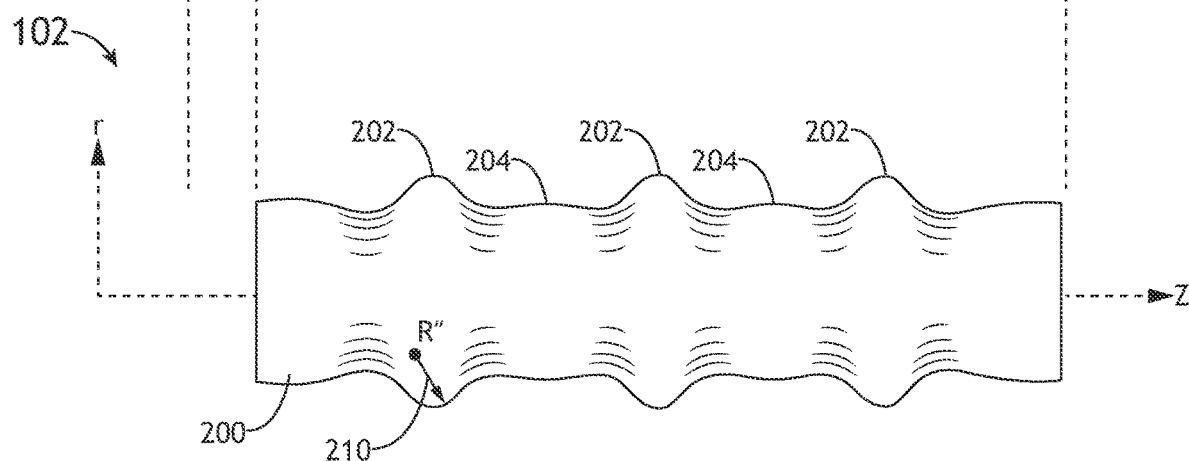
FIG. 2D illustrates a side view of an undulated frame beam member of an aircraft seat frame with enhanced dynamic response in a compressive-load state, in accordance with one or more embodiments of the disclosure.

As illustrated in FIGS. 2A and 2C, the frame beam member 102 may be unloaded. As illustrated in FIGS. 2B and 2D, the frame beam member 102 may be compressive-loaded. As the frame beam member 102 deforms with a corresponding change in length $\Delta z$ 206 due to an applied load the one or more undulations 202, 204 may be configured to see a change in their local curvatures.

In one non-limiting example as illustrated in FIGS. 2C and 2D, a particular undulation 202 is considered before and after an applied load. A curvature of the particular undulations 202 may be defined by radii R' 208 and R" 210 in un-deformed and deformed states, respectively, as curvature is a characteristic inversely proportional to a corresponding radius. A change in curvature (or similarly a change in radii R' 208 and R" 210) may be a result of local deformation due to bending of walls of the frame beam member 102, which indicates a mechanism of local bending under applied compressive load with associated additional elasticity of the entire frame beam member 102 and an opportunity for additional energy absorption due to visco-elastic properties of materials.

It is noted herein that where the at least one wall 200 of the tubular volume includes a non-uniformly distributed radius R' 208 along a length of an individual undulation, similar non-uniform change in radii R'208 and R"210 may be expected along a length of other undulations on the at least one wall 200 of the tubular volume.

In general, a curvature of the one or more undulations 202, 204 when in a deformed state may be different from the curvature of the one or more undulations 202, 204 when in an un-deformed state. Where the frame beam member 102 is under a compressive load, the curvature of the one or more undulations 202 when in the deformed state may be greater than the curvature of the one or more undulations 202, 204 when in the un-deformed state. It is noted herein, however, that the frame beam member 102 may be under an alternative type of load including, but not limited to, tension, bending, torque, or a combination of load types. Here, the curvature of the one or more undulations 202, 204 when in the deformed state may be different (e.g., not greater than, but instead including, but not limited to, less than) the curvature of the one or more undulations 202, 204 when in the un-deformed state. Therefore, the above description should not be interpreted as a limitation on the present disclosure but merely an illustration.

The one or more undulations 202, 204 may be configured to bend simultaneously under an applied load. The one or more undulations 202, 204 may be configured to bend sequentially (e.g., through a multi-step progressive deformation or even folding). An opportunity to control process of local bending of the frame beam member through modification of shapes of individual undulations can be especially valuable for optimization of an amount of energy absorption and/or member elasticity under dynamic loads.

The introduction of the one or more undulations 202, 204 in the frame beam member 102 may be configured to control an overall elasticity (or stiffness) of the frame beam member 102. For example, the elasticity may be controlled based on the number of the one or more undulations 202, 204 and/or the types of shapes of the one or more undulations 202, 204. Controlling the number and/or the shapes of the one or more undulations 202, 204 may result in a frame beam member 102 that is relatively stiff under a low load level (e.g., during a static or quasi-static condition) and is less stiff under a high load level (e.g., during a dynamic load condition).

The frame beam member 102 may include a select cross-section at any part along the length of the frame beam member 102. The cross-section may have any shape known in the art. For example, the cross-section may be circular or elliptic. By way of another example, the cross-section may be polygonal (e.g., include at least one side with a flat shape). For instance, the cross-section may be rectangular. The frame beam member 102 may have a varying cross-section shape along the length of the frame beam member 102.

Figure 3A:
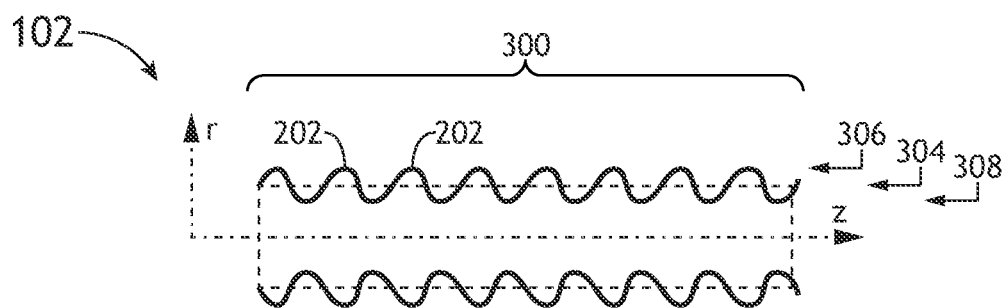
FIG. 3A illustrates an axial cross-sectional view of an undulated frame beam member of an aircraft seat frame with enhanced dynamic response, in accordance with one or more embodiments of the disclosure.
Figure 3B:
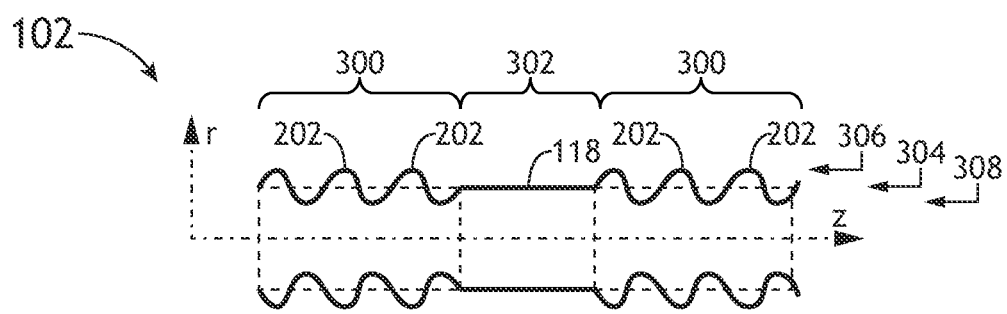
FIG. 3B illustrates an axial cross-sectional view of an undulated frame beam member of an aircraft seat frame with enhanced dynamic response, in accordance with one or more embodiments of the disclosure.
Figure 3C:
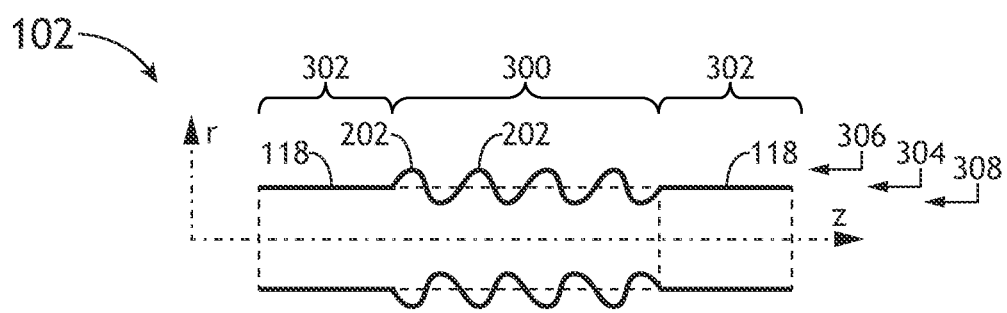
FIG. 3C illustrates an axial cross-sectional view of an undulated frame beam member of an aircraft seat frame with enhanced dynamic response, in accordance with one or more embodiments of the disclosure.
Figure 3D:
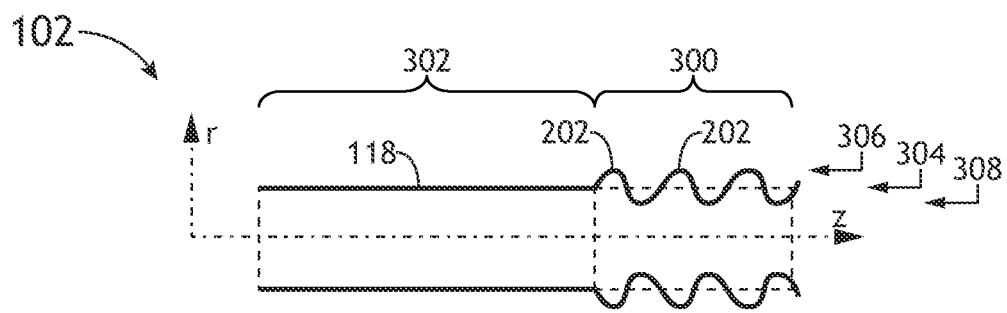
FIG. 3D illustrates an axial cross-sectional view of an undulated frame beam member of an aircraft seat frame with enhanced dynamic response, in accordance with one or more embodiments of the disclosure.
Figure 3E:
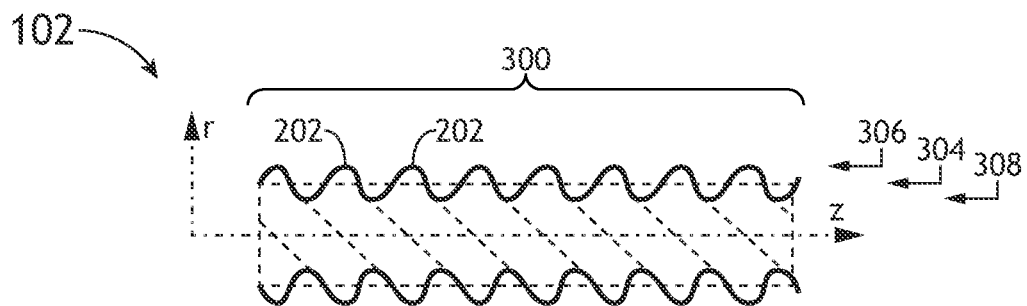
FIG. 3E illustrates an axial cross-sectional view of an undulated frame beam member of an aircraft seat frame with enhanced dynamic response, in accordance with one or more embodiments of the disclosure.
Figure 3F:
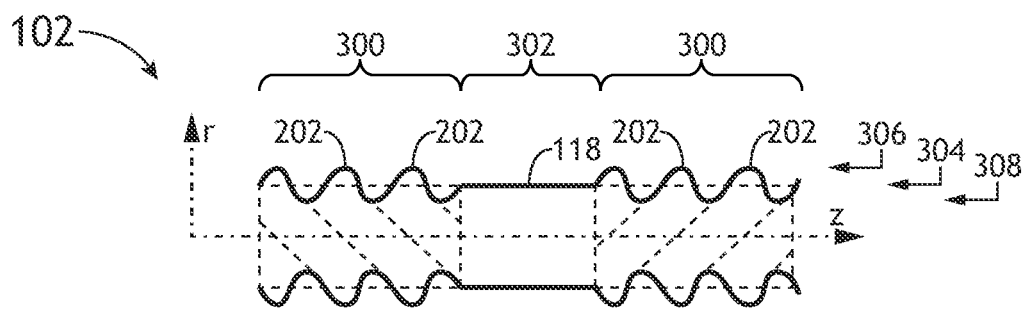
FIG. 3F illustrates an axial cross-sectional view of an undulated frame beam member of an aircraft seat frame with enhanced dynamic response, in accordance with one or more embodiments of the disclosure.
Figure 3G:
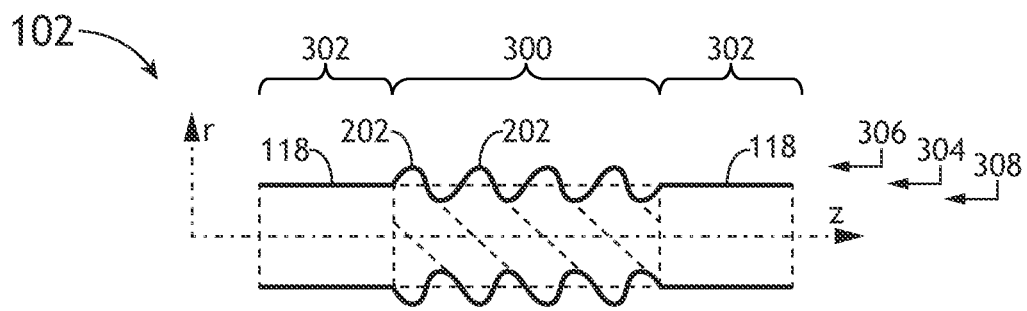
FIG. 3G illustrates an axial cross-sectional view of an undulated frame beam member of an aircraft seat frame with enhanced dynamic response, in accordance with one or more embodiments of the disclosure.
Figure 3H:
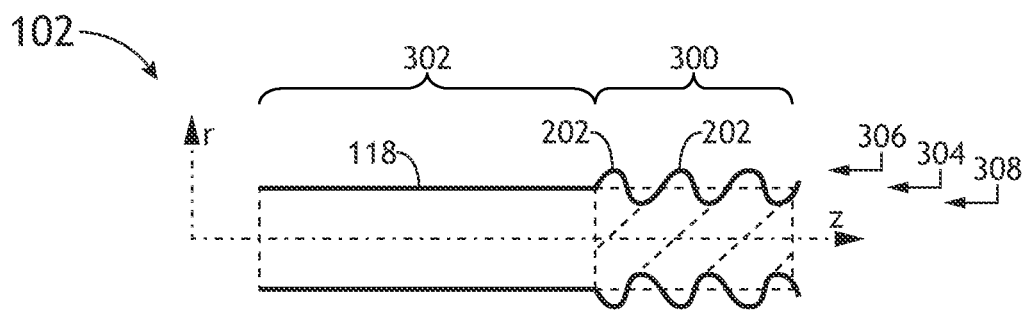
FIG. 3H illustrates an axial cross-sectional view of an undulated frame beam member of an aircraft seat frame with enhanced dynamic response, in accordance with one or more embodiments of the disclosure.

Referring now to at least FIGS. 3A-3H, the one or more undulations 202 may be dispersed along all or a part of the length of the frame beam member 102. For example, as illustrated in FIGS. 3A and 3E, the entire length of the frame beam member 102 may be a segment 300 including one or more undulations 202. By way of another example, as illustrated in FIGS. 3B and 3F, the frame beam member 102 may include a segment 302 with a uniform axial cross-section 118 located at a mid-length point of the frame beam member 102 and multiple segments 300 each including one or more undulations 202 located at respective ends of the frame beam member 102. By way of another example, as illustrated in FIGS. 3C and 3G, the frame beam member 102 may include a segment 300 including one or more undulations 202 located at a mid-length point of the frame beam member 102 and multiple segments 302 each including a uniform axial cross-section 118 located at respective ends of the frame beam member 102. By way of another example, as illustrated in FIGS. 3D and 3H, the frame beam member 102 may include a segment 300 including one or more undulations 202 located at one end of the frame beam member 102 and a segment 302 including a uniform axial cross-section 118 located at a second end of the frame beam member 102.

The frame beam member 102 may include a primary radius 304 along the entire length of the frame beam member 102. One or more area(s) with uniform axial cross-section(s) 118 may be a select distance from a central axis equal or substantially equal to the primary radius 304. It is noted herein, however, that the one or more area(s) with uniform axial cross-section(s) 118 may be a select distance from the central axis less than or greater than the primary radius 304. Therefore, the above description should not be interpreted as a limitation on the present disclosure but merely an illustration.

The one or more undulations 202 may undulate between an outward secondary radius 306 greater than the primary radius 304 and an inward secondary radius 308 less than the primary radius 304. For example, the outward secondary radius 306 and the inward secondary radius 308 may be set at a same (but opposite sign) distance from the primary radius 304. It is noted herein, however, the outward secondary radius 306 and the inward secondary radius 308 may be different distances from the primary radius 304. Therefore, the above description should not be interpreted as a limitation on the present disclosure but merely an illustration.

As illustrated in FIGS. 3A-3D, the one or more undulations 202 may form hoops or rings around the frame beam member 102, with each undulation 202 being separately positioned a select distance from an end of the frame beam member 102 along the length of the tubular volume.

As illustrated in FIGS. 3E-3H, the one or more undulations 202 may be non-constant in their position along the length of the frame beam member 102. For example, the one or more undulations 202 may be set in a spiral formation along the length of the tubular volume of the frame member 102. Where there are multiple spiral formations, the multiple spiral formations may wind clockwise or counter-clockwise along the length of the tubular volume of the frame beam member 102. For example, the multiple spiral formations may wind in different directions (e.g., as illustrated in FIG. 3F). By way of another example, the multiple spiral formations may wind in a same direction.

The one or more undulations 202 may be uniform (e.g., in amplitude, frequency, shape, or the like) along the length of the tubular volume of the frame member 102. It is noted herein, however, that at least one of the one or more undulations 202 may be different (e.g., in amplitude, frequency, shape, or the like) from the other undulations 202 along the length of the tubular volume of the frame member 102. For example, non-uniform undulations may be useful to control a sequential deformation (e.g., through a multi-step progressive deformation, folding, or the like), to increase an amount of energy absorption and/or increase overall elasticity (e.g., should the aircraft seat frame 100 be subjected to dynamic loads). Therefore, the above description should not be interpreted as a limitation on the present disclosure but merely an illustration.

Figure 4A:
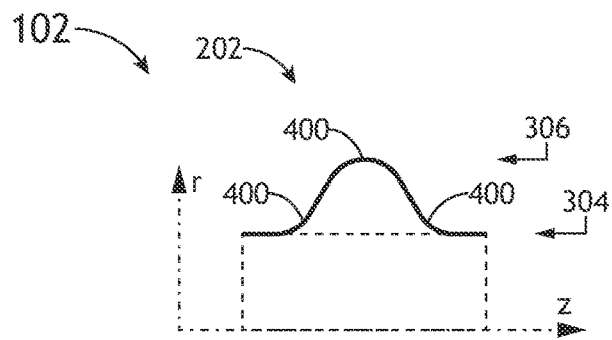
FIG. 4A illustrates an axial cross-sectional view of an undulation of a frame beam member of an aircraft seat frame with enhanced dynamic response, in accordance with one or more embodiments of the disclosure.
Figure 4B:
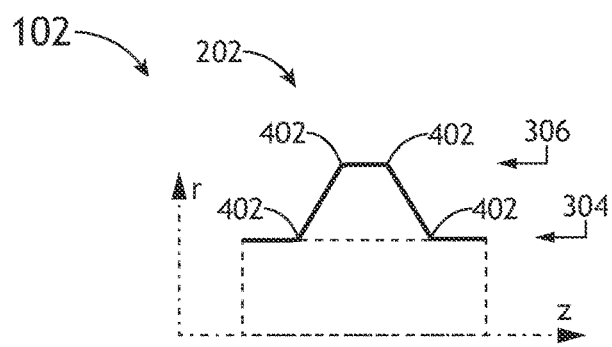
FIG. 4B illustrates an axial cross-sectional view of an undulation of a frame beam member of an aircraft seat frame with enhanced dynamic response, in accordance with one or more embodiments of the disclosure.
Figure 4C:
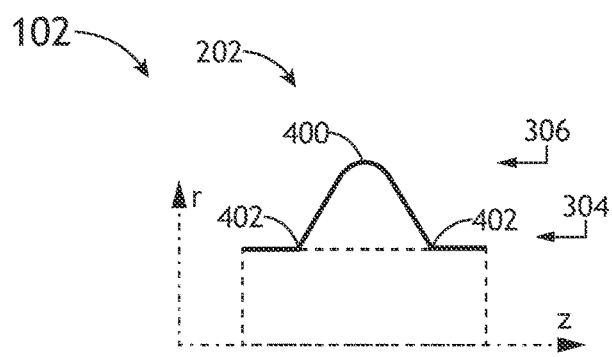
FIG. 4C illustrates an axial cross-sectional view of an undulation of a frame beam member of an aircraft seat frame with enhanced dynamic response, in accordance with one or more embodiments of the disclosure.
Figure 4D:
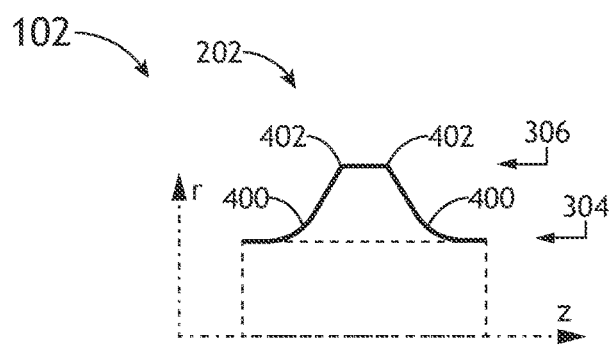
FIG. 4D illustrates an axial cross-sectional view of an undulation of a frame beam member of an aircraft seat frame with enhanced dynamic response, in accordance with one or more embodiments of the disclosure.
Figure 4E:
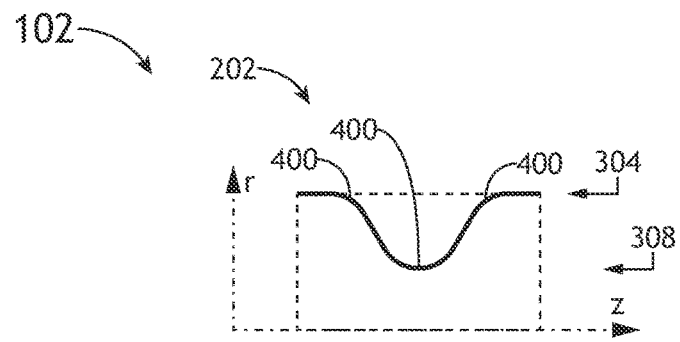
FIG. 4E illustrates an axial cross-sectional view of an undulation of a frame beam member of an aircraft seat frame with enhanced dynamic response, in accordance with one or more embodiments of the disclosure.
Figure 4F:
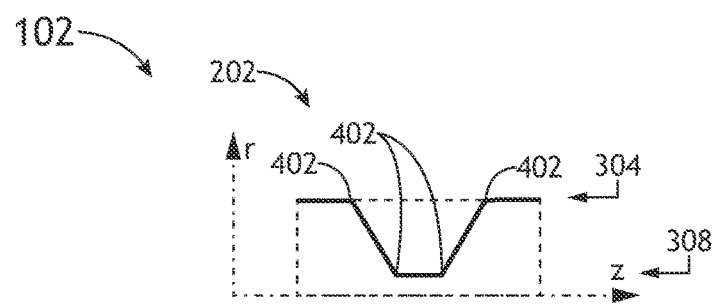
FIG. 4F illustrates an axial cross-sectional view of an undulation of a frame beam member of an aircraft seat frame with enhanced dynamic response, in accordance with one or more embodiments of the disclosure.
Figure 4G:
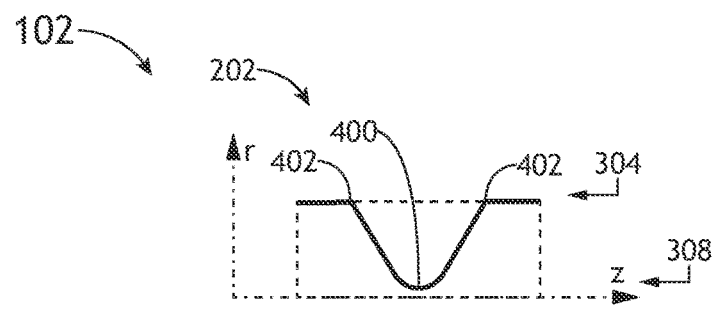
FIG. 4G illustrates an axial cross-sectional view of an undulation of a frame beam member of an aircraft seat frame with enhanced dynamic response, in accordance with one or more embodiments of the disclosure.
Figure 4H:
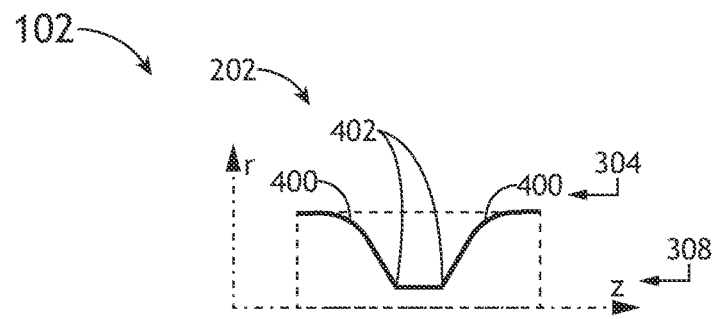
FIG. 4H illustrates an axial cross-sectional view of an undulation of a frame beam member of an aircraft seat frame with enhanced dynamic response, in accordance with one or more embodiments of the disclosure.

Referring now to FIGS. 4A-4H, an undulation 202 may include one or more curved segments 400 (e.g., smooth transition surfaces between adjacent lines or edges) and/or one or more linear segments 402 (e.g., corners between adjacent lines or edges). For example, as illustrated in FIGS. 4A and 4E, the undulation 202 may include only curved segments 400, resulting in the undulation 202 having a double curvature shape. By way of another example, as illustrated in FIGS. 4B and 4F, the undulation 202 may include only linear segments 402, resulting in the undulation 202 having a polygonal shape. By way of another example, as illustrated in FIGS. 4C and 4G, the undulation 202 may include a curved segment 400 surrounded by linear segments 402, resulting in the undulation 202 having a hybrid polygonal and convex curvature shape. By way of another example, as illustrated in FIGS. 4D and 4H, the undulation 202 may include linear segments 402 surrounded by curved segments 400, resulting in the undulation 202 having a hybrid polygonal and concave curvature shape.

As illustrated in FIGS. 4A-4D, the undulation 202 may be arranged radially outward and configured to undulate between the primary radius 304 and the outward secondary radius 306.

As illustrated in FIGS. 4E-4H, the undulation 202 may be arranged radially inward and configured to undulate between the primary radius 304 and the inward secondary radius 308.

Although the embodiments illustrated in FIGS. 4A-4H include a fully-convex undulation 202 (e.g., as illustrated in FIGS. 4A-4D) or a fully-concave undulation 202 (e.g., as illustrated in FIGS. 4E-4H), it is noted herein an undulation 202 illustrated in FIGS. 4A-4D and an undulation 202 illustrated in FIGS. 4E-4H may each be a component of a full undulation 202, such that the full undulation 202 may include a convex component and a concave component. Therefore, the above description should not be interpreted as a limitation on the present disclosure but merely an illustration.

Figure 5A:
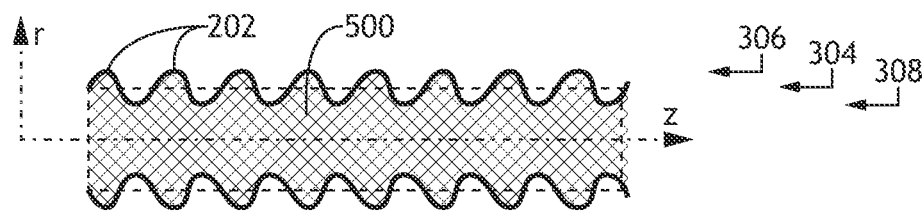
FIG. 5A illustrates an axial cross-sectional view of a mold and a frame beam member of an aircraft seat frame with enhanced dynamic response, in accordance with one or more embodiments of the disclosure.
Figure 5B:
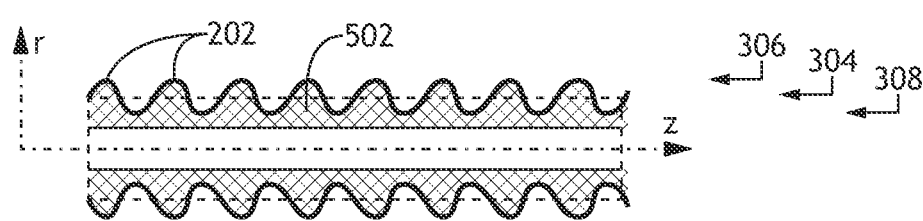
FIG. 5B illustrates an axial cross-sectional view of a mold and a frame beam member of an aircraft seat frame with enhanced dynamic response, in accordance with one or more embodiments of the disclosure.
Figure 5C:
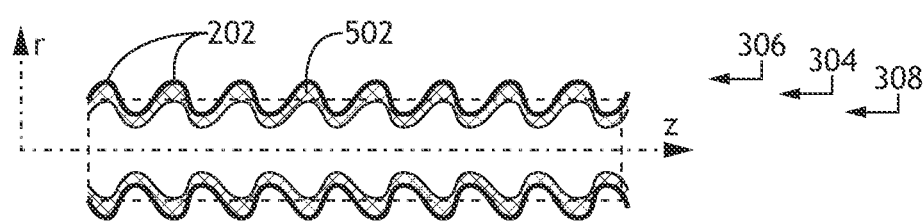
FIG. 5C illustrates an axial cross-sectional view of a mold and a frame beam member of an aircraft seat frame with enhanced dynamic response, in accordance with one or more embodiments of the disclosure.

FIGS. 5A-5C in general illustrate methods or processes used for fabricating the frame beam member 102, in accordance with one or more embodiments of the disclosure.

Referring now to FIG. 5A, the frame beam member 102 may be fabricated with a mold 500 that is configured to be removed following the fabrication of the frame beam member 102.

In a step, the mold 500 may be formed. In a step, the composite material may be placed on the mold 500. For example, the composite material may be placed on the mold 500 after the mold 500 is formed. By way of another example, the composite material may be placed on the mold 500 as the mold 500 is formed (e.g., via additive manufacturing, or the like).

An exterior surface of the mold 500 may trace and/or form the undulations 202 along the length of the frame beam member 102, such that the mold 500 may have a varying radius and may mimic the shape of the interior surface of the frame beam member 102 (e.g., depending on positioning of the mold 500).

In a step, the mold 500 may be removed from the interior or the exterior of the frame beam member 102 via a removal process. The removal process may include, but is not limited to, washing it out/off, chemical decomposition or stripping, or the like. For example, the mold 500 may be removed from the interior or the exterior after the frame beam member 102 cures to a select hardness (e.g., where the frame beam member 102 is fabricated from a thermoset). By way of another example, the mold 500 may be removed from the interior or the exterior after the frame beam member 102 solidifies to a select hardness (e.g., where the frame beam member 102 is fabricated from a thermoset).

Although embodiments of the disclosure illustrate the mold 500 as being an interior removable mold 500, it is noted herein the mold 500 may be an exterior removable mold (e.g., a mold used during injection molding, casting, or the like; a mold formed during additive manufacturing; or the like). Therefore, the above description should not be interpreted as a limitation on the present disclosure but merely an illustration.

Referring now to FIGS. 5B and 5C, the frame beam member 102 may be fabricated with a mold 502 that is configured to remain inserted within the frame beam member 102 following the fabrication of the frame beam member 102. For example, the mold 502 may be fabricated from a lightweight polymer (e.g., including, but not limited to, a thermoplastic) with a thickness that will not substantially affect the elasticity and/or capability of the frame beam member 102 to absorb energy under dynamic load conditions.

In a step, the mold 502 may be formed. In a step, the composite material may be placed on the mold 502. For example, the composite material may be placed on the mold 502 after the mold 502 is formed.

An exterior surface of the mold 502 may trace and/or form the undulations 202 along the length of the frame beam member 102 along an exterior edge, such that the mold 502 may have a varying radius and may mimic the shape of the interior surface of the frame beam member 102 (e.g., depending on positioning of the mold 502).

As illustrated in FIG. 5B, the mold 502 may have an interior edge with a constant radius, such that the mold 502 has a defined cylindrical cavity.

As illustrated in FIG. 5C, the mold 502 may have a corresponding interior edge that may trace the exterior edge, such that the exterior edge has a corresponding varying radius. In this regard, the mold 502 may include a thin-wall shape.

In comparing FIGS. 5B and 5C, the mold 502 illustrated in FIG. 5B may be thicker but easier to make, while the mold 502 illustrated in FIG. 5C may be thinner by requiring additional methods or processes including, but not limited to, gas-assisted forming.

[moo] In one example, where the mold 502 is a polymeric mold fabricated from a thermoplastic, the melting temperature of the mold 502 may need to be higher than the curing temperature of the frame beam member 102 if the frame beam member 102 is fabricated from a thermoset, or may need to be higher than the melting temperature of the frame beam member 102 if the frame beam member 102 is fabricated from a second thermoplastic.

In general, the frame beam member 102 may be fabricated via one or more methods or processes including, but not limited to, AFP, filament-winding, braiding, a combination of these one or more methods or processes, or the like.

Although embodiments of the disclosure illustrate the frame beam member 102 as being hollow (e.g., as including a defined cavity), it is noted herein at least a portion of the frame beam member 102 may have a solid portion for at least a length of the frame beam member 102, to the extent the solid portion does not interfere with the elasticity and/or capability of the frame beam member 102 to absorb energy under dynamic load conditions. Therefore, the above description should not be interpreted as a limitation on the present disclosure but merely an illustration.

Although embodiments of the disclosure illustrate the frame beam member 102 as being fabricated from a composite material, it is noted herein the frame beam member 102 may be fabricated from any material (e.g., a metal, alloy, metalloid, or non-metal element or a compound including a metal, alloy, metalloid, or non-metal element) configured to provide the frame beam member 102 with the elasticity and/or capability of the frame beam member 102 to absorb energy under dynamic load conditions.

In this regard, the one or more undulations 202 may result in the frame beam member 102 having an exterior surface configured to combine the advantages of the stiffness and strength properties of composite materials necessary during static or quasi-static load conditions and the elasticity and/or capability of the frame beam member 102 to absorb energy under dynamic load conditions. For example, this form of enhanced dynamic response may reduce the risk of damage to the aircraft seat frame 100. By way of another example, this form of enhanced dynamic response may reduce the risk of injury during dynamic load conditions. By way of another example, this form of enhanced dynamic response may provide a higher comfort in static or quasi-static load conditions.

It is noted herein the aircraft seat frame 100 and/or the components of the aircraft seat frame 100 (e.g., the one or more frame beam members 102 including the one or more undulations 202) may be installed within an aviation environment which may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an aviation environment, it is noted herein the one or more frame beam members 102 including the one or more undulations 202 are not limited to the aircraft seat frame 100 within the aviation environment and/or the aircraft components within the aviation environment. For example, the one or more frame beam members 102 including the one or more undulations 202 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the one or more frame beam members 102 including the one or more undulations 202 may be coupled to and/or configured to operate with an apparatus sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A frame beam member for an aircraft seat frame with enhanced dynamic response, comprising:
   a tubular volume including at least one wall with a first plurality of undulations and a second plurality of undulations sequentially arranged and extending radially outward along a length of the tubular volume, the first plurality of undulations and the second plurality of undulations being configured to allow the tubular volume to absorb energy of a compressive load applied during a flight scenario through local bending of the first plurality of undulations and the second plurality of undulations,
   the first plurality of undulations being configured to have a first curvature when unloaded, the first plurality of undulations being configured to have a second curvature when the compressive load is applied, the second curvature being greater than the first curvature, the second plurality of undulations being configured to have a third curvature when unloaded, the first curvature being greater than the third curvature by which the first plurality of undulations are configured to deform prior to the second plurality of undulations,
   the frame beam member being one of a plurality of frame beam members of the aircraft seat frame, the plurality of frame beam members being configured to couple to a plurality of joints of the aircraft seat frame, at least one joint of the plurality of joints or at least one frame beam member of the plurality of frame beam members being configured to couple to an aircraft body.

2. The frame beam member of claim 1, the at least one wall of the tubular volume including a single segment with the first plurality of undulations and the second plurality of undulations.

3. The frame beam member of claim 1, the at least one wall of the tubular volume including at least one segment with the first plurality of undulations and the second plurality of undulations and at least one segment with a uniform axial cross-section.

4. The frame beam member of claim 3, the at least one wall of the tubular volume including a single segment with the first plurality of undulations and the second plurality of undulations located at a mid-length point of the tubular volume and a segment with the uniform axial cross-section located at each end of the tubular volume.

5. The frame beam member of claim 3, the at least one wall of the tubular volume including a single segment with the uniform axial cross-section located at a mid-length point of the tubular volume and a segment with the first plurality of undulations and the second plurality of undulations located at each end of the tubular volume.

6. The frame beam member of claim 3, the at least one wall of the tubular volume including a single segment with the uniform axial cross-section located at a first end the tubular volume and a single segment with the first plurality of undulations and the second plurality of undulations located at a second end of the tubular volume.

7. The frame beam member of claim 1, the first plurality of undulations and the second plurality of undulations being separately positioned a select distance along the length of the tubular volume from an end of the tubular volume.

8. The frame beam member of claim 1, the first plurality of undulations and the second plurality of undulations being in a spiral formation around the tubular volume along the length of the tubular volume.

9. The frame beam member of claim 1, one or more of the first plurality of undulations and the second plurality of undulations including, in an axial cross-section, at least one of a double curvature shape, a polygonal shape, a hybrid polygonal and convex curvature shape, a hybrid polygonal and concave curvature shape, or a combination.

10. The frame beam member of claim 1, being fabricated from a fiber-reinforced polymer-matrix composite material,
    the reinforced fibers including at least one of carbon fibers, glass fibers, organic fibers or a combination,
    the polymer-matrix including a thermoset or a thermoplastic.

11. The frame beam member of claim 10, the first plurality of undulations and the second plurality of undulations of the at least one wall of the tubular volume being formed on an exterior surface of a mold configured to be removed following fabrication.

12. The frame beam member of claim 10, the tubular volume including a mold, the first plurality of the undulations and the second plurality of undulations of the at least one wall of the tubular volume being formed on an exterior surface of the mold.

13. The frame beam member of claim 1, being fabricated from a metal, alloy, metalloid, or non-metal element or a compound including a metal, alloy, metalloid, or non-metal element.

14. An aircraft seat frame with enhanced dynamic response, comprising:
    a plurality of frame beam members, each frame beam member of the plurality of frame beam members comprising:

a tubular volume including at least one wall with a first plurality of undulations and a second plurality of undulation sequentially arranged and extending radially outward along at least a portion of a length of the tubular volume, the first plurality of undulations and the second plurality of undulations being configured to allow the tubular volume to absorb energy of a compressive load applied during a flight scenario through local bending of the first plurality of undulations and the second plurality of undulations, the first plurality of undulations being configured to have a first curvature when unloaded, the first plurality of undulations being configured to have a second curvature when the compressive load is applied, the second curvature being greater than the first curvature, the second plurality of undulations being configured to have a third curvature when unloaded, the first curvature being greater than the third curvature by which the first plurality of undulations are configured to deform prior to the second plurality of undulations; and a plurality of joints configured to couple to the plurality of frame beam members, at least one joint of the plurality of joints or at least one frame beam member of the plurality of frame beam members being configured to couple to an aircraft body.

15. The aircraft seat frame of claim 14, the first plurality of undulations and the second plurality of undulations being in a spiral formation around the tubular volume along the length of the tubular volume.

16. The aircraft seat frame of claim 14, one or more of the first plurality of undulations and the second plurality of undulations including, in an axial cross-section, a double curvature shape formed of curved segments.

17. The aircraft seat frame of claim 14, one or more of the first plurality of undulations and the second plurality of undulations including, in an axial cross-section, a polygonal shape formed of linear segments.

18. The aircraft seat frame of claim 14, one or more of the first plurality of undulations and the second plurality of undulations including, in an axial cross-section, a hybrid polygonal and convex curvature shape formed of a curved segment surrounded by linear segments.

19. The aircraft seat frame of claim 14, one or more of the first plurality of undulations and the second plurality of undulations including, in an axial cross-section, a hybrid polygonal and concave curvature shape formed of a linear segment surrounded by curved segments.

* * * * *